(12) United States Patent
Swidan (10) Patent No.: US 12,179,150 B2
(45) Date of Patent: Dec. 31, 2024

(54) PRESSURE EXCHANGER UNIT FOR SAVING ENERGY IN DESALINATION PLANTS

(71) Applicant: Mohamed Abdelwahab Wahby Swidan, Alexandria (EG)

(72) Inventor: Mohamed Abdelwahab Wahby Swidan, Alexandria (EG)

(73) Assignee: Mohamed Abdelwahab Wahby Swidan, Alexandria (EG)

( * ) Notice: Subject to any disclaimer, the term of this patent is extended or adjusted under 35 U.S.C. 154(b) by 583 days.

(21) Appl. No.: 17/437,550

(22) PCT Filed: Mar. 26, 2019

(86) PCT No.: PCT/EG2019/000008
§ 371 (c)(1),
(2) Date: Sep. 9, 2021

(87) PCT Pub. No.: WO2020/192857
PCT Pub. Date: Oct. 1, 2020

(65) Prior Publication Data
US 2022/0152555 A1  May 19, 2022

(51) Int. Cl.
*B01D 61/06* (2006.01)
*F04F 13/00* (2009.01)

(52) U.S. Cl.
CPC .............. *B01D 61/06* (2013.01); *F04F 13/00* (2013.01)

(58) Field of Classification Search
CPC ........... F04F 13/00; F04D 13/04; B01D 61/06
See application file for complete search history.

(56) References Cited

U.S. PATENT DOCUMENTS 4,067,665 A * 1/1978 Schwartzman ......... F04D 13/04
415/209.1
4,887,942 A   12/1989 Hauge
(Continued)

FOREIGN PATENT DOCUMENTS

CN       101440828 A    5/2009

*Primary Examiner* — Philip E Stimpert
(74) *Attorney, Agent, or Firm* — The Webb Law Firm (57) ABSTRACT

The present invention relates to a energy recovery unit in desalination plants or other applications as (oil & gas), wherein the energy of the pressure exchanger PE is provided by the exchange of pressure between the $1^{st}$ fluid, which can be the high-pressure concentrated water from the desalination plant output, and the $2^{nd}$ fluid, which can be the low-pressure feeding water to the desalination plants, wherein the $1^{st}$ fluid enters into the pressure exchanger through HPI and the pressure is transferred to the $2^{nd}$ fluid through the pressure exchanger. Thus, the pressure of the $2^{nd}$ flow is raised and pushed through HPO to RO desalination membrane. The course of this cycle is as follows: (HPI/E/44/X45/46/C/55/X56/57/A/HPO) and $2^{nd}$ fluid is entered into pressure exchanger through LPI and $1^{st}$ fluid is swiped out with low pressure (after exchanging pressure with $2^{nd}$ fluid) from the pressure exchanger through LPO. The course of this cycle is as follows: (LPI/A/54/X52/Y52/Z52/51/C/47/Z48/Y48/X48/50/E/LPO). PE consists of stationary cylinder "C" and rotating disc "A,B,D&E".

16 Claims, 10 Drawing Sheets

(56) References Cited

U.S. PATENT DOCUMENTS

| | | |
|---|---|---|
| 6,537,035 B2 | 3/2003 | Shumway |
| 9,976,573 B2 | 5/2018 | Martin et al. |
| 2006/0037895 A1 | 2/2006 | Shumway |
| 2013/0294944 A1 | 11/2013 | Hirosawa et al. |
| 2014/0048143 A1* | 2/2014 | Lehner .................. B01D 61/10 137/625.21 |
| 2014/0128656 A1 | 5/2014 | Arluck et al. |
| 2016/0062370 A1 | 3/2016 | Gaines-Germain et al. |
| 2017/0130743 A1 | 5/2017 | Anderson |

* cited by examiner

Disc-D

Disc-D1  Disc-D2

11.a 11.b 11.c

Disc-B

11.d

11.e 11.f 12.a

Section A-A 12.b 12.c 12.d

PRESSURE EXCHANGER UNIT FOR SAVING ENERGY IN DESALINATION PLANTS

CROSS-REFERENCE TO RELATED APPLICATION

This application is the United States national phase of International Application No. PCT/EG2019/000008 filed Mar. 26, 2019, the disclosure of which is hereby incorporated by reference in its entirety.

BACKGROUND OF THE INVENTION

Field of Invention

The present invention relates to an energy saving unit in desalination plants by exploiting the high pressure of highly salt-concentrated water in pressing the water feeding the plant and saving the energy consumed in the plant. More specifically, the present invention relates to an energy-saving unit that transmits energy from one fluid to another via rotary discs and a stator cylinder, both the cylinder and the disc containing blanks.

Description of Related Art

Desalination plants consume very high energy to generate the necessary pressure for feed water, and to force it to pass through the desalination membranes, thereby overcoming reverse osmosis. During the operation of the plant, there is a loss of much energy consumed, which exceeds 50% of the supply capacity consumed by the plant, and therefore the need for energy saver to take advantage of that wasted energy.

Different techniques for energy saving in desalination plants have addressed two main directions.
First direction: Turbine:
which works by adding a turbine in one of two ways:
 a) Putting a turbine 70 on the same axis as the main pressure pump 4. As shown in FIG. 1
 b) Putting the turbocharger 71, works as a booster pump installed on the high pressure pump 4 line. As shown in FIG. 2.
Second direction: Isobaric:
 In which the pressure of concentrated water discharged from the desalination plant is transmitted to the feeding water entering the plant. The energy saving devices used in this technique are called pressure exchangers. This is done by one of the following methods:
  Using one or more hydraulic cylinders 73, as shown in FIG. 3.
  Using rotor R, as shown in FIG. 4.
Most notably are pressure exchangers with a rotor R
 Several prior art documents have dealt with rotor pressure exchanger technique and methods of application, for example:
  U.S. Pat. No. 4,887,942 (19 Dec. 1989)
  U.S. Pat. No. 6,537,035B2 (25 Mar. 2003)
  US 2006/0037895 A1 (23 Feb. 2006)
  US 2014/0128656 A1 (8 May 2014)
  US 2016/0062370 A1 (3 Mar. 2016)
  US 2017/0130743 A1 (11 May 2017)
  U.S. Pat. No. 9,976,573 B2 (22 May 2018)
 All prior arts have the same principle of exchanging pressure wherein: Rotor pressure exchangers include a rotating cylindrical body R (approximately 25 cm to 40 cm) length with stator faces at both ends, and 4 holes for feed and discharge:
  HPI—High Pressure Water Inlet
  LPO—Low pressure water outlet
  LPI—Low pressure feeder inlet
  HPO—High pressure feeder outlet
 The holes are distributed on both sides, each with two holes.
 The water enters the energy saving unit through one of the two sides with the pressure of the highly concentrated saline water coming out of the desalination plant to meet the free cylinder which in turn begins to spin, during the cylinder rotation the pressure is transferred from high pressure saline to low pressure feed water.
 The general design of this type of energy savers (pressure exchangers) is shown in FIG. 4; drawing panel no: 1).
 Although this type of energy saver is the most efficient in the world, it has many disadvantages, notably:
  The sides are stator and the cylindrical part is freely moving, rotates within a stator casing/housing with a narrow clearance between them.
  Loss of pressure and water occurs in the clearance between the moving cylindrical part and the stator casing.
  The clearance between the moving cylindrical part R and the stator casing should be as narrow as possible, as it increases the loss of pressure and water through it, hence making it more difficult to manufacture.
  As a result of fine clearance, there is a high friction between the moving cylindrical part R and the stator casing, especially in the presence of impurities in the water entering, these impurities enter between the stator and moving parts and cause erosion and damage of the cylindrical part.
  The rotary cylinder part causes noise during rotation as a result of its length, the clearance between it and the stator casing and clearance between it and the fixed sides. Thus the whole pressure exchanger is very loud during operation.
  The rotary cylinder part R is usually made of ceramic, in order to reduce friction and increase efficiency. However, ceramics are damaged or broken if any small solid body enters with impurities inside the energy saver plant, addition to the difficulty of its formation and operation.
  The rotary cylindrical part is difficult to maintain, as it is avoided to completely removed from the stator casing for the difficulty of returning it to the same operating mode.
  The length of the cylindrical part R cannot be increased to a certain extent because the cylinder is subjected to slight clearance differences during manufacturing, which greatly affects performance and increases the amount of loss. Moreover, in the case of increased length, operating and friction problems may occur, which means that the energy supply capacity of the energy saver plant is limited (maximum 68 m$^3$/h), so large stations require a large number to be connected in parallel for the required action.
  The limited dimensions of the cylinder are also due to the control of the total weight of the cylinder, which increases the inertia forces, which may adversely affect the regularity of the rotation or increase the need for higher rotation energy.

The limited dimensions of the cylinder to avoid increasing the area exposed to friction and unevenness of clearance along the cylinder and its perimeter.

The limited length to avoid increased maintenance difficulty, which sometimes requires the partial release of the cylindrical part R of the casing.

The limited length to avoid the difficult of implementation, either for the cylindrical part R or the stator casing at various manufacturing stages to adjust the clearance along the cylinder and its perimeter.

The cylindrical part R rotates at high speed to achieve an adequate flow to compensate for the short length of the rotary cylinder.

Although the speed of rotation of the cylinder part R is high, it cannot be increased from a certain limit due to the fine clearance and to avoid the rapid unit damage to the plant.

The above points show that the productivity of the plant is limited, and cannot be increased from a certain limit.

SUMMARY OF THE INVENTION

The current invention relates to an energy saving plant of isobaric direction, has a stator cylindrical part C R, wherein, unlike any other system, the cylindrical part is a stator/non rotating and is a single cylinder, not a moving cylindrical part and a stator casing. This stator cylindrical part C has longitudinal tubes 60 and rotary side discs are located on both ends—unlike the fixed discs in other systems—these discs rotates in cavities on both sides of the stator cylindrical part. Side discs may be two, three or four discs according to the different embodiments of the inventions, and the design conditions for each unit. These discs rotates by the pressure of highly concentrated saline water coming out of the desalting membranes 6 or can be supplied by a small additional motor, as will be explained in different embodiments of the present inventions.

This significant exchange is in that the moving part is the side discs rather than the cylindrical part adding significant advantages to the energy saver and overcome the challenges, difficulties and defects in the corresponding energy saver. Of these advantages are the ease of manufacturing, operation and maintenance, saving waste energy for rotation of the moving parts and allowing the length of the cylindrical part C with the tubes 60 to be increased, allowing the increase of discharge passing through the energy saver.

Further, the clearances between the discs and the casing are also very short in length compared to the moving cylinder, which has a great effect in reducing the loss of pressure and water leaking in the clearance, and also in prolonging the lifetime of the plant as well as increase its efficiency, productivity and decreasing seals.

BRIEF DESCRIPTION OF DRAWINGS

Additional advantages and details are explained in greater detail below with reference to the exemplary embodiments that are illustrated in the accompanying schematic figures, in which:

FIG. 1 is a power supply according to prior art;

FIG. 2 is an alternative power supply according to prior art;

FIG. 3 is a hydraulic cylinder isobaric pressure exchanger according to prior art;

FIG. 4 is a rotor PX isobaric pressure exchanger according to prior art;

FIG. 5 is a complete system of a deslination plant according to prior art;

FIG. 6 is basic isobaric pressure in connection with rotor direction according to prior art;

FIG. 7 is a desalination plant according to an embodiment of the invention;

FIG. 8 is the rotor disc front and rear views and stator cylinder according to an embodiment of the invention;

FIG. 9 is the pressure exchanger without the optional discs according to an embodiment of the invention;

FIG. 10 is a perspective view of rotor discs according to an embodiment of the invention;

DESCRIPTION OF THE INVENTION

The present invention relates to a PE energy saving unit from an isobaric direction that includes a stator cylinder part C with ducts, or longitudinal tubes and cavities at both ends to include rotor side discs, and rotor discs B&D for the entry and exit of both highly salty and feed water in order to exchange pressure between them inside the stator cylinder part C, the side discs revolve around one axis by one axis 58 ensuring the connection of rotational movement of the discs with each other. In addition to optional A & E discs which designed to utilize the water pump at a inclination angle to rotate the side rotor discs or at least reduce the energy consumed to rotate them, side discs are covered by end casing.

FIG. 1, and FIG. 2 are power supplies from the turbo direction:

FIG. 1 shows placing a turbine on the same axis of the main pressure pump

FIG. 2 shows the placement of a Turbocharger as a booster pump on the high-pressure pump discharge line.

FIG. 3 shows the hydraulic cylinder isobaric pressure exchanger

FIG. 4 shows the rotor R PX isobaric pressure exchanger

FIG. 5 shows the complete system of a desalination plant using the energy saver from the isobaric direction, showing the membrane desalination unit (RO membrane) and extracting the high concentration saline water at 59 bar to insert the pressure exchanger (PX) from the High Pressure Water Inlet (HPI), and shown the source of feed water 1, from which the feed water is pumped by pump 2 with a pressure around 3 bar to enter the pressure exchanger unit (PX) from the Low pressure water Inlet (LPI). The concentrated water is drained by low pressure from the Low pressure water outlet (LPO) and the feeding water is discharged by high pressure from the High pressure water outlet (HPO) to the membrane desalination unit 6 (RO membrane) through the compensation pump (8), which compensates the lost pressure throughout the desalination membranes and the pressure exchanger.

FIG. 6 "Prior art": Reflects the basic idea of pressure exchangers of isobaric rotor direction, in which:

S1: stator disc into which High pressure concentrated water is introduced through (slot 26) and out of it by low pressure through (slot 22).

S2: Low pressure feeding water inlet disc into the pressure exchanger through (slot 18) and out of it by high pressure through (slot 15)—the disc is stator.

R: Rotor Cylinder part

19: Longitudinal ducts in the rotor cylindrical body in which pressure is exchanged.

In which high pressure concentrated water is directed to disc S1 to enter from the port HPI to the duct 16 through the slot 26 and be directed to the cylindrical rotor part R at a certain angle, to force it to rotate and pass through longitudinal holes 19 filled with feed water that have been entered into the longitudinal ducts through disc S2 at low pressure LPI into the duct to enter the rotator through slot 18.

As a result of the high pressure of the concentrated water inside the longitudinal ducts 19, the concentrated water will push the feeding water and transfer the pressure from the concentrated water to the feeding water and push it out of the pressure exchanger with high pressure from the port HPO through the slot 15 and the duct 13, this occurs during half the cycle of the cylindrical part R. In the second half of the cycle, the concentrated water has lost its pressure and the pressure of the feeding water is higher than the pressure of the concentrated water, which in turn drives the concentrated water out of the system through the port LPO through the slot 22 and the duct 17.

During repeated cycles of the cylindrical part, pressure exchange occurs between concentrated water and feeding water.

FIG. 7 describes a desalination plant using the energy saver PE (7). The general system of the plant is the same as the general system of the plant in FIG. 5 with the replacement of the PX energy saver described in the prior art with the PE energy saver subject of the present invention.

FIG. 8 describes the PE pressure exchanger the subject of the present invention and the components therefor as follows; stator cylindrical part C, rotor disc B front and rear views, rotor disc D front and rear views, water input disc A and the water outlet/discharge disc E.

FIG. 8*a* describes the rotor disc B front and rear views and all the slots and ducts on which, in addition to the face of the cylinder part C stator from the back, and the rotor disc A through which the feeding water gets out of which with a high pressure from HPO and the feed water gets into which with a low pressure LPI, wherein the disc A is optional in the unit and not a basic component of it.

FIG. 8 B describes the rotor disc D front and rear views and all the slots and ducts on which, and the face of the cylinder part C stator from the front and the rotor disc E, through which the highly salty concentrated water gets into with high pressure HPI and the concentrated water with low pressure LPO drained out appears, and the rotor disc E is optional in the unit and not a basic component in it.

FIG. 8C describes the assembly of the pressure exchanger PE, showing the stator cylinder part C, and at its ends there are the cavities 75 with the side rotor discs, the longitudinal tubes 60 through which the water passes and the pressure exchange takes place, also, the central duct 76, in which the axis/rod 58 passes and has appropriate clearances between them to prevent friction between them and allow the rotation of the axis 58 inside the stator cylindrical part C, the side rotor discs D & B appear on both ends, in addition to the optional discs A & E.

Taking into consideration that the main work of the optional discs A & E is rotating the axis 58 which in turn rotates the rotor discs D & B, or at least reducing the energy consumed for rotating them.

FIG. 8*aa* shows that the feed water enters with a low pressure F4 into the duct 54 on the front face of disc B and moves through the slot X52, the duct Y52, the slot Z52 of the duct 51 on the back face of the disc B and exit at a pressurized F3 from the duct 55 on the back face of the disc B through the slot X56 of the duct 57 on the front face of disc B.

FIG. 8*bb* shows that concentrated water enters with high pressure F1 into the slot 44 in the front face of the disc D and moves through the slot X45 to the slot 46 on the back face of the disc D, as well as moves with low pressure F2 from the duct 47 on the back face of the disc D through the slot Z48 and the duct Y48 to slot 58 and then to the duct 50 on the front face of disc D.

FIG. 9 shows the PE pressure exchanger without the optional A & E discs, showing the possibility of running the pressure exchanger without them, replacing them with a small motor M that rotates the discs D & B via a spindle 58, which connects the side rotor discs to the motor.

FIG. 9*a* shows the shape of the disc B from the front and back faces and all the ducts and slots on it, on which there are the axis/rod 58 and the cylindrical stator part C, in which there are the central duct 76 through which the axis/rod 58 passes FIG. 9*b* shows the disc D from the front and back faces and all the ducts and slots on which, and on which there is the axis/rod 58 and the stator cylindrical part C in which there is the central duct 76 through which the spindle 58 passes FIG. 9*c* shows of the energy saver, the arrangement of its parts, and the position of the small motor M.

Drawing 7: an embodiment of the invention to raise the discharge passing through the energy saver and compensating the losses of pressure.

FIG. 10*a* shows the increase/duplication in the number of slots X56, X52 & Z52 and ducts Y52 between the sides of disc B.

FIG. 10*b* shows the increase/duplication in the number of slots X45, X48 & Z48, and ducts Y48 between the two sides of the disc D.

Figure 11:
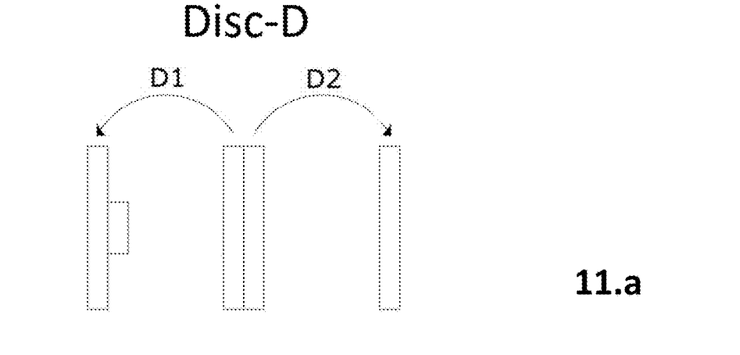
FIG. 11 is a perspective view of rotor discs and stator cylinder according to an embodiment of the invention; and, FIG. 12 is a perspective view of the energy saver components according to an embodiment of the invention.

Drawing 8 and Drawing 9: an embodiments of the invention to raise the discharge passing through the power supply and compensating the lost pressure, and facilitating manufacturing and operation:

FIG. 11 shows the division of both disc B into two discs B1, which represents the front side of the disc and B2 which represents the back side of the disc and the same is the case for the disc D FIG. 11*a* shows the shape of the discs D1 & D2 separately and interfering FIG. 11*b* shows the shape of the back and front sides, the side view, and a section of the discs D1 & D2, through which there are the merged ducts 67, which included a group of ducts and slots (X48, Y48 & Z48) together to facilitate the manufacture and operation as well as the slot 78 in which the discs D1 & D2 are interlaced and in which there is the fixation pin\protrusion 68 in the disc D1 together with the interlock slots 69 on disc D2, the merged duct 44 which formed due to duplication of slot X45.

FIG. 11*c* shows the assembly shape of the discs D1 & D2, so that they together form the original shape of the disc D as shown in FIGS. 8*b* & 9*b*.

FIG. 11*d* shows the shape of the discs B1 & B2 separately and interfering

FIG. 11*e* shows the shape of the back and front sides, the side view, and a section of the discs B1 & B2, through which there are the merged ducts 80, which included a group of ducts and slots (X52, Y52 & Z52) together to facilitate the manufacture and operation as well as the slot 79 in which the discs B1 & B2 are interlaced and in which there is the fixation pin\protrusion 68 in the disc B1 together with the interlock slots 69 on the disc B2, the merged duct 57 which formed due to duplication of slot X56.

FIG. 11f shows the assembly shape of the discs B1 & B2 so that they together form the original shape of the disc B as shown (8a) & (9a).

Drawing No 9 shows an embodiments of the invention to increase the discharge of the energy saver, as well as to reduce internal friction in it and to facilitate operation and manufacture.

FIG. 12a shows the general perspective of the energy saver components PE

FIG. 12b shows a section in the energy saver—the subject of the invention

FIG. 12c shows an embodiments in which clearances K1, K2, K3 & K4 are made between the rotor side discs and between the stator cylindrical body C and the end casings 61 & 62. These clearances reduce friction occurring inside the energy saver and reduce the seals on the surface area of the discs, in the figure there is an axis bearing 86 at the end of the axis/rod 58 and the mechanical seal around the axis/rod 58 on the motor side.

FIG. 12d shows the possibility of extending the length of the stator cylindrical part C and it can also be extended by similar adjacent extension modules. It can also be cancelled and converted to two connected discs by a group of tubes 60p working as a longitudinal tubes 60

Below is a summary of the reference numbers on the drawings:

C A stator cylindrical part
R rotor cylindrical part
S1 Stator side disc
S2 Stator side disc
A&E side discs whose task is to rotate the spindle by the action of water pressure
M Motor
B & D side discs for water distribution
F3 high pressure feeding water
F4 low pressure feeding water
F1 high pressure concentrated water
F2 low pressure concentrated water
HPO High pressure outlet
LPI Law pressure inlet
HPI High pressure inlet
LPO Law pressure outlet
1 feeding water source
2 feeding pump
4 high pressure pump
6 Membrane desalination unit
7 energy saver
8 compensation pump
13 Semi-duct on the stator disc
14 Semi-orbicular duct on the stator disc
15 slot for water passage between the stator disc and the rotor cylindrical body
16 Semi orbicular duct on the stator disc
17 Semi orbicular duct on the stator disc
18 slot for water passage between the stator disc and the rotor cylindrical body
19 longitudinal ducts of the rotator body
22 slot for water passage between the stator disc and the rotor cylindrical body
26 slot for water passage between the stator disc and the rotor cylindrical body
44 rotary ducts on the front side of the disc D
X45 slot connecting the two faces of the disc D
46 Semi-orbicular ducts on the back side of the disc D
47 Semi-orbicular ducts on the back side of the disc D
X48 Slot in the back side of the disc D, connecting the duct 50 to the duct Y48
Y48 Duct in the disc D connects the two slots X52 and Z52
Z48 slot connecting the duct 47 on the back side of the disc D and the duct Y48
50 full internal duct on the front side of the disc D
51 Partial duct in the back side of disc B
X52 slot connects the duct 54 to the duct Y52 on the front side of Disc B
Y52 duct connects the two slots X52 and Z52
Z52 slot connecting the duct Y52 with the duct 51 on the back side of the disc B
54 full duct in front side of the disc B
55 Semi-orbicular ducts in the back side of the disc B
X56 slot connecting the duct 57 and the duct 55 on both sides of the disc B
57 Duct on the front side of the disc B
58 axis/rod
60 longitudinal tubes
61 end casing
62 end casing
63
67 combined ducts comprising the ducts X48, Y48, Z48, 47 & 50
68 fixation pin\protrusion
69 Gap to interlock with fixation pin\protrusion
70 Turbine
71 Turbocharger
75 end cavities in the stator cylindrical body
76 central duct with the stator cylindrical bod, through which the axis passes
78 Slot in the disc D2, to interlock with the disc D1
79 Slot in the disc B2, to interlock with the disc B1
80 combined ducts comprising ducts X52, Y52, Z52, 51 & 54
85 mechanical seal
86 axis bearing
87 free piston
88 Bumpers
$C_{right}$ The right part of the stator cylindrical body
$C_{left}$ The left part of the stator cylindrical body
$C_x$ is an optional cylindrical part used as an extension of the stator cylindrical part
$60_p$ alternative external tubes for longitudinal tubes inside the cylindrical part
K1 Clearance
K2 Clearance
K3 Clearance
K4 Clearance
B1 Half-Disc for the disc B
B2 Half-Disc for the disc B
D1 Half-Disc for the disc D
D2 Half-Disc for the disc D The "stator/non-rotating cylinder" C is a cylindrical body of a suitable material, this cylindrical body is stator/fixed and does not rotate, the stator cylindrical body C includes longitudinal ducts 60 distributed over diagonal distances on the surface of the cylinder and extends its length, those ducts 60 cause the occurrence of a pressure exchange process in it, the cylindrical body includes lateral cavities within which the rotator side discs rotates, and at its end there are end casings 61, 62 covering the side cavities and their discs.

Drawings from 4 to 10 shows the claimed pressure exchanger and its components, in which the highly salty concentrated water gets into the pressure exchanger from the hole HPI with high pressure from the front side of the rotor disc "D Face" and passes through it to the back side of "D Back".

FIGS. 8b, 8bb and 9b shows the front side of the disc "D Face" has external rotor ducts 44, in which the highly salty concentrated water passes, and small hole X45 (or a set of holes) through which the concentrated water passes from the front side D face to the back side "D back", in which is it demonstrated that the rotor Channels "circumferential or complete" become partial crescent ducts 46, for preserving the pressure of the water and directing it towards the cylinder part C. Further, there are other crescent ducts 47 in the back side of "D Back", where the highly salty concentrated water is received after it gets out from the stator cylinder part C, where pressure exchange between it and the feeding water takes place in the longitudinal tubes 60, and gets out with low pressure while passing through the ducts 47 to the front side of the disc "D Face" through small hole Z48 (or a set of holes), ducts Y48 (or a set of ducts) and small hole X48 (or a set of holes) to pass into the internal ducts 50 and from them to LPO.

Figures shown that the pressure in ducts 46 and 47 on the rear side of disc "D Back" is constant. For instance, duct 46 has continuous high pressure, whether at the top or in the bottom while the concentrated high pressure water F1 enters, as well as the duct 47 has low-pressure, regardless the position, whether at the top or in the bottom while the concentrated high pressure water exit from the stator cylindrical part C with a low pressure F2 after pressure exchange. Therefore, the pressure between the concentrated water and the feeding water is exchanged along with steadiness of the cylinder part C.

FIGS. 8a, 8aa and 9a shows the front and rear sides of the B disc, where the feed water enters by a low pressure F4 into the pressure exchanger from the port (LPI) to the duct 54 to pass through a small hole Z52 (or a set of holes) and a small hole Y52 (or a set of ducts) and a small hole X52 (or set of holes) for the back of the disc "B Back" for duct 51 to pass through the ducts 60 of stator cylinder C in order to be provided with pressure throughout pressure exchange with the highly concentrated high pressure salty water which enters from disc D.

Duct 55 is on the back side of the disc "B Back", which receives the feeding water after pressure exchange process F3 to pass through the X56 hole (or a set of holes) to the Channel 57 in the front face of the disc "B Face" to get outside the pressure exchanger PT with high pressure from HPO, thus directed to the membrane desalination unit.

Figures shown that ducts 51 and 55 on the back of the disc "B Back" disc has constant pressure. For instance, duct 51 has continuous low pressure whether at the top or in the bottom, as well as Channel 55 has continuous high pressure regardless of its position, whether at the top or in the bottom position. Therefore, the pressure between the concentrated water and the feeding water is exchanged along with steadiness of the cylinder part C.

Both discs B and D are connected to each other through a rotor shaft/axis 58 to ensure that they are rotating together. It is necessary to connect both discs together to ensure proper exchange of pressure. The axis 58 passes through a central duct 76 at the axis of the stator cylinder part C. in addition, in the case of the use of discs A and E to supply rotational movement, they are connected to the same rotor shaft 58.

It is clear from the above that the rotation of the external discs B and D is the control of pressure exchange process inside the unit, thus it is necessary to have a motion source to runs the rotor shaft 58 and therefore rotate both the disc B and disc D. Neither the he rotor shaft 58 nor the B and D discs need high operation energy, this is due to low friction between the discs and the casing, wherein the thickness of the discs is limited, therefore only a small motor is needed to rotate them or any suitable motion source supply.

The pressure of the water entering the pressure exchanger can be used also to rotate the discs by using additional discs A & E. The concentrated water enters through disc E with high pressure and inclination angle causing the rotation of the corresponding disc D, then the rotation of disc B, due to being on the same axis. Other holes are there for discharge of the concentrated water coming out from the unit at low pressure.

On the other side of unit is the disc A, through which the feeding water enters at low pressure through small pump, said low pressure generates light motion helps in the rotation of the discs B and D in the same way by entering the water on the disc with inclination angle that helps the corresponding disc B to rotate. In addition, on the disc A are holes for discharging the feeding water that comes out from the pressure exchanger at high pressure to direct it to the membrane desalination unit.

According to the designing conditions of each unit, based on the flow and pressure, a small engine (or any appropriate motion source) is used to rotate the discs B and D, or to rotate them without external motion source by the power of the hydraulic motion resulting from the discs A & E or by using both methods.

Pressure exchanger as shown above is distinguished from any other isobaric pressure exchanger by several characteristics, the most significant is the easiness of manufacturing, lower losses in the clearance (as the clearance is only located along the discs, not along the cylinder part) .The pressure exchanger can work under any pressure and with any flow due to the ability to control the length and diameter of the cylinder part C, as well as the number of the internal tubes 60 according to available conditions.

The steadiness of the cylinder part C reduces the admixture of the concentrated water and the feeding water as a result of the contact between them. In one embodiments of the present invention, a free piston 87 can be put inside every longitudinal channel/tubes 60 in the cylinder part C to prevent the direct contact between the concentrated water and the feeding water and at the same time allows pressure exchange between them, The steadiness of the cylinder part also reduces the operating sound of the power supply and increases the ease of its manufacture and operation.

Method Of Operating Pressure Exchanger PE

The highly salty concentrated water (drained out from the membrane desalination unit with high pressure) enters the pressure exchanger from HPI, at the same time the feeding water enters from LPI, wherein these holes are located in the side/terminal casing of the pressure exchanger, through the rotation of the side discs, the water is directed to the longitudinal tubes 60, through which the pressure exchange occurs and then the water is discharged again from the pressure exchanger.

Embodiment of the Invention

In one embodiment of the present invention, the concentrated water enters from HPI to be directed to the disc D and the feed water enters from LPI to be directed to the disc B, wherein both discs B and D are on the same rotation axis which is the same rotation shaft 58, which is connected to the source providing rotary motion to the side discs.

In another embodiment, the water enters from HPI with an inclination angle on the disc E and the water LPI with an inclination angle on the disc A, wherein both discs A and E are on the same rotation axis B and D, which is rotary shaft 58. Both pressure and the inclination angle cause the discs to rotate, through which the source or rotatory motion can be excluded in the previous embodiment, or at least the consumed energy can be reduced.

After ensuring the discs with the same rotatory motion:

Water enters from HPI to the face of the disc D Face to enter inside a full-fledged duct 44 to pass through a hole inside X45 (or a set of holes) to the back face of the disc D Back to enter a partial duct 46.

The high pressure concentrated water moves with the discs within the space occupied by the partial duct 46 to enter with high pressure into longitudinal tubes 60 in the cylinder part C . Thus, the high pressure moves with the movement of the disc in order for the space occupied by the channel 46 permanently to be exposed to high pressure.

At the same time, the feeding water enters from LPI to the face of disc B face to enter inside a full-fledged duct 54 to pass through slot X52 (or a set of slots), duct Y52 (or a set of ducts) and slot Z52 (or a set of slots) to the back face of the disc B Back to enter into a partial duct 53. The water moves in turn from the partial duct 51 to the longitudinal tubes 60 in the stator cylinder part C to.

If we assume instantaneous system steadiness, the upper part of the system is subjected to concentrated water pressure and the lower part of the system is filled with low pressure feeding water.

Once the discs have rotated half the cycle, the situation is reversed as the high pressure water enters the feed water-filled channel to press it firmly out of the pressure exchanger with high pressure from HPO and on the other side the concentrated water loses its pressure to exit the system from LPO. Where the feeding water is drained after it is supplied with pressure in the opposite direction to channel 55 on the rear side of disc B Back pass through a hole and Channel X56 (or a set of holes) to full-fledged Channel 57 on the face of the disc B Face to HPO.

After losing a large part of the pressure, the concentrated water moves to the partial duct 47 on the rear side of the disc D Back to pass through hole Z48 (or a set of holes), duct Y48 (or a set of ducts), hole X48 (or a set of holes) to full-fledged duct 50 on the face of disc D Face to LPO.

In an embodiment of the invention, to increase discharge and reduce losses, the number of slots x56 is increased/duplicated over the circumference of the duct 55 to connect both sides of the disc B, and connects the duct 55 to the duct 57, the increase in the number of slots X52, the ducts Y52 and the slots Z52 to connect the ducts 51, 54 and 57 to the sides of disc B, as shown in FIG. 10a.

The number of slots X45 is increased/duplicated over the circumference of the duct 46 to connect the two sides of the disk D and connects the duct 46 to the duct 44 and the increase in the number of the slots X48, the ducts Y48 and the slots Z48 to connect the ducts 47, 51 and 44 on both sides of the disk D, as shown in FIG. 10b.

In an embodiment of the invention, the disc B can be divided into two discs B1 & B2 to facilitate operation and manufacture where the face B as a disc includes ducts 54 and 57 and the slots X52 & X56 and the face B as an another disc includes ducts 51 and 52 and the slots Z52 & Y52 and the two discs are attached and act as one but the division of the disc in this way is much easier to manufacture and operate, and for the disc D it is also divided into two discs in the same way.

When the previous two embodiments are combined and to facilitate manufacturing and operation processes, the slots and ducts 55, 57 and X56 are combined together 54, 51, X52, Y52 and Z52 together on the tow discs B1 & B2 of the disc B1 in the combined ducts 80 and 55.

The slots and ducts 44, 46 and X45 together, 47, 44, X48, Y48 and Z48 together are also combined on the discs D1 & D2 of the disc D1 in the combined ducts 67 and 44.

The combined slots and this embodiment is generally shown in drawings 8 and 9; FIGS. 11a, 11b, 11c, 11d, 11e and 11f.

Thus, manufacturing side discs is as easy as possible and reduces losses and friction.

The combined structure of this embodiment is shown in drawing 10; FIGS. 12a & 12b In an embodiments of the present invention, a free piston 87 can be put inside every longitudinal duct 60 in the stator cylinder part C to ensure that there is no admixture between the feeding water and the concentrated water with the possibility of adding bumpers 88 at the end of each stage which prevent the escape of the piston from longitudinal duct 60 as shown on drawing 10; FIG. 12c.

In an improvement of the previous embodiments and in another embodiment there are clearances K1, K2, K3 & K4 (as shown in FIG. 12c of drawing No. 10) at both ends of the stator cylindrical part and the end casings, by reduce friction between the discs to a minimum and reducing pressure on the seals, in the figure there is a mechanical seal at the entrance of the axis/shaft 58 and there is an end terminal with an axis bearing 86 at the end of the axis/shaft 58 from the other end as shown on the drawing 10; FIG. 12c.

To increase the flow of the pressure exchanger, its productivity can be increased by lengthening the stator cylinder part C by adding fixed repeated $C_x$ parts in the middle between the two ends of $C_{right}$ & $C_{left}$ or cancelling the middle part of the stator cylindrical body and replacing it with outer extended tubes 60p between the two end parts $C_{right}$ & $C_{left}$, both variants are shown on drawing No. 10; FIG. 12d.

In general, the system is divided into two halves; one with high pressure and the other with low pressure in an exchanging way with the steadiness of the cylinder part C and the rotation of the side parts. This position adds significant advantage for the pressure exchanger of the present invention, due to statistic steadiness that reduces the admixture of the feeding water and the concentrated water, which is attributed to the cylinder part C and pressure exchange caused by the rotation of discs D and B.

The pressure exchanger according to any embodiment of the present invention is characterized by that the small length of fine clearances, as the clearance is located along the length of each disc not on the length of the cylinder part, so that the manufacturing and formation process becomes easy and this rises the efficiency of operation and reduces erosion and noise caused by the motion of parts of pressure exchanger and limits the use of seals.

The invention claimed is:

1. A fluid pressure exchanger for converting a first high-pressure fluid stream to a second low-pressure fluid stream and a first low-pressure fluid stream to a second high-pressure fluid stream, the fluid pressure exchanger comprises a stator cylinder, side rotary discs, side-end casings, and a source of rotor motion;

wherein the side rotary discs comprise at least a first rotary disc and a second rotary disc;

longitudinal tubes in which pressure is exchanged between the first high-pressure fluid and the first low-pressure fluid;

wherein the first rotary disc and the second rotary disc are connected by a rotor shaft;

wherein the first rotary disc is covered by a first end casing, the first end casing having an inlet for entrance of the first high-pressure fluid and a first outlet for exit of the second low-pressure fluid stream;

wherein the second rotary disc is covered by a second end casing, the second end casing having a second inlet for the entrance of the low-pressure fluid and a second outlet for the exit of the second high-pressure fluid stream;

wherein the front face of the first rotary disc is provided with an internal circular channel, and an external circular channel, wherein the internal circular channel and the external circular channel are arranged in concentric spaced circles, the center thereof is the center of the front face of the first rotary disc;

wherein the back face of the first rotary disc is provided with an upper semi-circular channel opposing a lower semi-circular channel;

wherein the front face of the second rotary disc is provided with an internal circular channel and an external circular channel wherein said internal circular channel and said external circular channel are arranged in concentric spaced circles, the center thereof is the center of the front face of the second rotary disc;

wherein the back face of the second rotary disc is provided with an upper semi-circular channel opposing a lower semi-circular channel;

wherein the external circular channel of the front face of the first rotary disc, and the upper semicircular channel of the back face of the first rotary disc are connected via at least one hole;

wherein the internal circular channel of the front face of the first rotary disc is connected to the lower semicircular channel of the back face of the first rotary disc via at least one duct, wherein the at least one duct has an open end in the internal circular channel of the front face of the first rotary disc and another open end in the lower semi-circular channel of the back face of the first rotary disc;

wherein the external circular channel of the front face of the second rotary disc, and the upper semicircular channel of the back face of the second rotary disc is connected via at least one hole; and wherein the internal circular channel of the front face of the second rotary disc, and the lower semicircular channel of the back face of the second rotary disc is connected via at least one duct, wherein the at least one duct has an open end in the internal circular channel of the front face of the second rotary disc, and another open end in the lower semicircular channel of the back face of the second rotary disc.

2. The pressure exchanger according to claim 1, wherein the source of the rotor motion is an external motor that is coupled to the rotor shaft.

3. The pressure exchanger according to claim 1, wherein the source of rotor motion comprises third and forth rotary discs.

4. The fluid pressure exchanger according to claim 3, wherein each of the third rotary disc and the fourth rotary disc having an internal plurality of holes and an external plurality of holes, arranged in two spaced concentric circles, wherein the external plurality of holes is configured for passing the first or second high pressure stream, and the internal plurality of holes is configured for passing the first or second low pressure stream.

5. The fluid pressure exchanger according to claim 4, wherein the external plurality of holes of the third rotary disc is opposing the external circular channel of the front face of the first rotary disc, and the internal plurality of holes of the third rotary disc is opposing the internal circular channel of the front face of the first rotary disc.

6. The fluid pressure exchanger according to claim 4, wherein the external plurality of holes of the fourth rotary disc is opposing the external circular channel of the front face of the second rotary disc, and the internal plurality of holes of the fourth rotary disc is opposing the internal circular channel of the front face of the second rotary disc.

7. The fluid pressure exchanger according to claim 4, wherein the first high-pressure fluid stream passes through the external plurality of holes of the third rotary disc with an inclination angle, causing the rotation of the third rotary disc; and wherein the first low-pressure fluid stream passes through the internal plurality of holes of the fourth rotary disc with an inclination angle, causing the rotation of the fourth rotary disc;

wherein the rotation of the third rotary disc and the fourth rotary disc causes the rotation of the rotor shaft, and consequently rotates the first and second rotary discs.

8. The pressure exchanger according to claim 1, wherein the front face of the first rotary disc is manufactured as a separate disc, and the back face of the first rotary disc is manufactured as a separate disc, then the two separate discs are assembled; and wherein the front face of the second rotary disc is manufactured as a separate disc, and the back face of the second rotary disc is manufactured as a separate disc, then the two separate discs are assembled.

9. The pressure exchanger according to claim 1, wherein the stator cylinder contains a central channel, through which the rotor shaft passes, without rotation of the stator cylinder.

10. The pressure exchanger according to claim 1, each of the longitudinal tubes contains a free piston for the purpose of pressure exchange without direct contact between the fluids; and, wherein each free piston moves freely within the longitudinal tube thereof, and each longitudinal tube contains bumpers that prevent the piston from escaping thereout.

11. The pressure exchanger according to claim 1, wherein the stator cylinder part and side rotor discs are manufactured from a material non-permeable to water.

12. The pressure exchanger according to claim 1, wherein extension parts of the stator cylinder are added or the middle part of the stator cylinder is replaced by a plurality of outer tubes or to increase the length of the stator cylinder.

13. The pressure exchanger according to claim 1, wherein the external circular channel of the front face of the first rotary disc, and the upper semicircular channel of the back face of the first rotary disc are connected via a plurality of holes; and wherein the internal circular channel of the front face of the first rotary disc is connected to the lower semicircular channel of the back face of the first rotary disc via a plurality of ducts.

14. The pressure exchanger according to claim 13, wherein the plurality of holes that connects the external circular channel of the front face of the first rotary disc with the upper semicircular channel of the back face of the first rotary disc are merged resulting in merging the upper portion of the external circular channel of the front face to the upper semicircular channel of the back face of the first disc as one channel; and     wherein the plurality of ducts, that connects the internal circular channel of the front face of the first rotary disc is connected to the lower semicircular channel of the back face, are merged in one duct.

15. The pressure exchanger according to claim 1, wherein the external circular channel of the front face of the second rotary disc, and the upper semicircular channel of the back face of the second rotary disc is connected via a plurality of holes; and     wherein the internal circular channel of the front face of the second rotary disc, and the lower semicircular channel of the back face of the second rotary disc is connected via a plurality of ducts.

16. The pressure exchanger according to claim 15, wherein the plurality of holes that connects the external circular channel of the front face of the second rotary disc, and the upper semicircular channel of the back face of the second rotary disc, are merged, resulting in merging the upper portion of the external circular channel of the front face to the upper semicircular channel of the back face of the second disc as one channel; and     wherein the plurality of ducts, that connects the internal circular channel of the front face of the second rotary disc to the lower semicircular channel of the back face of the second rotary disc, are merged in one duct.

\* \* \* \* \*

UNITED STATES PATENT AND TRADEMARK OFFICE
CERTIFICATE OF CORRECTION

PATENT NO. : 12,179,150 B2
APPLICATION NO. : 17/437550
DATED : December 31, 2024
INVENTOR(S) : Mohamed Abdelwahab Wahby Swidan It is certified that error appears in the above-identified patent and that said Letters Patent is hereby corrected as shown below:

In the Claims

Column 13, Line 1, Claim 1, before "longitudinal" insert -- wherein the stator cylinder contains a plurality of --

Signed and Sealed this
Twenty-fifth Day of February, 2025

Coke Morgan Stewart
*Acting Director of the United States Patent and Trademark Office*